Patented Feb. 10, 1942

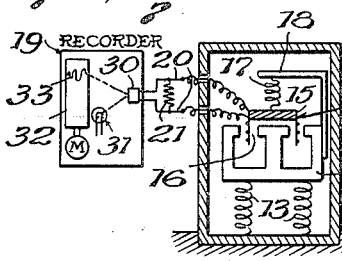

2,272,984

UNITED STATES PATENT OFFICE 2,272,984

SEISMOGRAPH

Otto F. Ritzmann, Baldwin Township, Allegheny County, Pa., assignor to Gulf Research & Development Company, Pittsburgh, Pa., a corporation of Delaware Application July 21, 1939, Serial No. 285,799

3 Claims. (Cl. 177—352)

This invention or discovery relates to seismographs; and it comprises an electrical seismograph of selective frequency response and including support means adapted to be placed in fixed relation with respect to the earth, two inertia members elastically supported for independent vibratory movement with respect to the support means in such manner as to have different natural periods of vibration, and electrical means for recording relative movement or motion between the two elastically supported members; all as more fully hereinafter set forth and as claimed.

Electrical seismographs or seismic wave detectors, as employed in seismograph prospecting, include a case adapted to be put in fixed relation with respect to the earth, a movable inertia member or mass element resiliently mounted in the case for vibratory movement with respect thereto, and electrical means for indicating relative displacement (or some function thereof with respect to time) of the mass member and the case. In typical seismographs the mass member may take the form of a magnet suspended on springs and opposed to a stationary coil. On relative movement of the coil and the magnet a corresponding electrical signal is induced in the coil. Or this arrangement may be reversed: the magnet being fixed and the coil mounted on springs. Some detectors are arranged to employ piezo-electric effects, capacitance changes and other electrical phenomena, in securing an indication, in lieu of electromagnetic effects. The electrical means for producing an electrical signal corresponding to mechanical vibrations are termed transducing means. In some cases, as in the coil-magnet type, the mass member itself forms part of the transducing means.

In these simple seismographs the electrical output is very low at low frequencies, increases sharply for higher frequencies and for still higher frequencies asymptotically approaches a limiting high value. The output may increase continuously with frequency or may rise to a high resonance value before approaching the limiting high-frequency value. This behavior of single-mass seismographs is explained as follows. At very low frequencies all parts of the apparatus tend to move up and down together, without relative movement, and the electrical output is zero. At extremely high frequencies the suspended mass tends to remain stationary in space while the case vibrates with respect to it, thereby producing a large relative movement between the mass and the case and a corresponding large electrical output. At intermediate frequencies resonance may occur and may cause a peak of output depending on how much the system is damped. With little damping the peak is high and sharp. Increasing the damping lowers and broadens the peak. Enough damping can be added to make the peak disappear entirely.

In seismograph prospecting it is usually best to record only a limited band of frequencies, and reject frequencies of magnitude falling outside the band. Because of the non-selective character of conventional detectors, and particularly because of their high output at the high end of the range of applied frequencies, it has been necessary to achieve this object by electrical filters in the detector output circuit, or other not altogether satisfactory expedients. Attempts have been made to provide seismographs which respond selectively to applied frequencies only within a certain band, that is, to provide tuned seismographs, with a view to simplifying the filtering problem. For example it has been proposed to mount a movable mass and a pressure-responsive element between two springs of different characteristics. This results in some improvement, but not much because the two springs are quite rigidly coupled together by the mass and pressure-responsive elements so that each spring cannot contribute a distinct frequency response characteristic of its own and a reasonable band-pass characteristic cannot be obtained.

One object of the invention is the provision of a seismograph embodying two movable mass members arranged for different natural periods of vibrations and including electrical transducing means responsive to relative movement (that is, responsive to relative displacement of the masses or some time function thereof) between the masses, so that the net output is suppressed at low and at high frequencies while intermediate frequencies are indicated with considerable sensitivity.

Another object is the provision of a seismograph of the magnet and coil type in which both the magnet and the coil are resiliently supported for relative movement with respect to each other and to the frame, whereby the output of the seismograph is maximum at a predetermined frequency and falls off at higher and at lower frequencies.

Another object is the provision of a dual seismograph of the magnet and coil type having two magnets in fixed relation to the earth and two coils electrically connected in opposition and in resiliently movable relation with respect to the magnets, but with different elastic characteristics for each coil suspension so that the net output of the seismograph has a maximum value at a predetermined frequency.

These and other objects are achieved by the provision of a seismograph including two mass members, both arranged for movement with respect to a fixed support (usually taking the form of a case or housing) set in the ground. The mass members are resiliently supported in such manner that each mass member has a different frequency response to earth vibrations, as by providing two spring supports of different elastic characteristics. Electrical transducing means are provided for measuring the movement of the mass members relative to each other; the transducing means being so constructed and arranged as to introduce only a negligible disturbance of the natural frequencies of the two vibrating mass members. The relative movement of the masses is zero at extremely low frequencies, when both the masses and the case tend to move together, in unison. Likewise the relative movement is zero at relatively high frequencies, when both masses tend to remain stationary in space while the case vibrates with respect to both of them. The maximum relative movement of the masses, and hence the maximum detector output, occurs at some intermediate frequency or frequencies determinable by a proper choice of masses, of elastic constants for the suspending system and of the damping applied to the individual or relative motion of the masses.

In embodying the invention in a coil-and-magnet type seismograph, the movable masses may both take the form of coils, or of magnets, or one may be a coil and the other a magnet. The invention is also readily susceptible of embodiment in piezo-electric, condenser and other types of seismographs.

In the accompanying drawing there are shown diagrammatically five examples of specific embodiments of apparatus within the purview of the invention. In the drawing, Fig. 1 is a view partly in vertical section, partly in elevation, of one form of the invention embodied in an electromagnetic seismic wave detector, Fig. 2 is a similar view of a modification of the apparatus of Fig. 1, Fig. 3 is a similar view of a dual detector arrangement, Fig. 4 is a diagrammatic showing of the invention embodied in a displacement responsive detector in conjunction with a frequency-modulated oscillator, Fig. 5 is a chart showing the relation of oscillator output to oscillator frequency in the oscillator system of Fig. 4, Fig. 6 is a diagrammatic showing, partly in vertical section and partly in elevation, of the invention embodied in a piezo-electric type detector, Fig. 7 is a chart showing typical frequency versus output voltage functions for a heavily-damped, two mass system, and Fig. 8 is a chart showing the relation of detector output to applied frequency in a slightly damped two mass system.

Referring to the drawing, and more particularly to Fig. 1, the seismograph includes a case 10 arranged to be set in fixed relation to the earth 11, either at the surface of the earth or buried therein. Within the case is a magnet 12, resiliently supported on the case by springs 13 so that the magnet is free to move, under elastic restraint, with respect to the case. The magnet forms one mass or inertia member of the system. A pick-up coil 14 on a core 15 is suspended within the gap 16 of the magnet, by a spring 17 and a support 18 attached to the magnet. The coil and its core form the second movable mass of the system. The coil is free to vibrate axially in the magnet gap. The coil is shown connected by leads 20 to a conventional recording instrument 19, including an oscillograph element 30 adapted to direct a focused beam of light from a lamp 31 on to a moving surface 32 of photographically sensitized paper or film, thereby producing a record trace 33. The elastic system comprising coil 14 and spring 17 is made to have a different natural period of vibration from the elastic system comprising magnet 12 and springs 13. Ordinarily for practical reasons this is achieved both by having the pickup coil less massive than the magnet, and also by having spring 17 of different size wire, number of turns, etc., from springs 13; but if desired the mass of the pickup coil can be made equal to the mass of the magnet and arm 18 and different types of springs employed, or spring 17 can be identical in elastic properties with springs 13 (considered together) and the masses of the pickup coil and the magnet made different. In practical embodiments it is convenient to construct the vibrating system including elements 14, 15 and 17 so as to have a lower natural resonant frequency, e. g. 15 cycles per second, and to construct the vibrating system including elements 12, 13 and 18 so as to have a higher natural resonant frequency, say 70 cycles per second. Advantageously the coil system is tuned to the lower frequency and the magnet system to the higher frequency, as described, because the low frequency system is the more limber or flexible of the two. Damage in transportation is avoided by making the relatively heavier magnet system supported more stiffly.

Selection of suitable values for the elastic constants of the springs and for the moving masses to provide a vibratory system of the desired resonant frequency is a simple matter. The period of vibration T (time required for one complete oscillation) of a system consisting of a mass suspended by a coil spring is given by the relation $T = 2\pi\sqrt{M/k}$ where M is the mass of the suspended weight (the mass of the spring itself being neglected) and $k$ is the spring constant, viz., the force necessary to produce unit deflection. Thus the natural period of vibration of the system is determined by a suitable selection of M, or of $k$, or of both M and $k$.

In operation, if the seismic waves in the ground are of very low frequency the magnet, the coil and the case all tend to move up and down (or sideways) together and as there is then little or no relative movement between the coil and the magnet, the output voltage in leads 20 is very low. If the applied frequency is very high, the magnet and coil tend to remain stationary while the case moves and again there will be little relative movement between magnet and coil and the output will be low. At intermediate applied frequencies relative movement takes place between the coil and magnet, due to their difference in mass and the difference in elastic characteristics of the two spring systems, and a substantial voltage is developed in leads 20.

In practical working embodiments it is desirable to introduce damping of some sort in the vibrating systems, in known ways, to prevent unduly sharp resonance, that is unduly selective frequency response, and excessive free vibration. Any suitable known damping means can be provided in my seismographs. In Fig. 1 relative movement between the coil and the magnet is shown as damped electromagnetically by insertion of a shunt resistor 21, of suitable magnitude, across the coil leads 20.

The embodiment shown in Fig. 1 is particularly advantageous. The apparatus is a true tuned seismograph and yet is but little more complicated than an ordinary seismograph. Moreover the apparatus of Fig. 1 has an especially desirable frequency response characteristic for seismograph prospecting purposes.

Fig. 2 shows a modification which functions similarly to Fig. 1. The pickup coil 14 connected to an indicating device 119 is suspended from the case by a spring 22, in lieu of the arrangement of Fig. 1. This type is easy to adjust since the springs are supported by stationary parts of the apparatus. Relative motion between the masses can be damped by shunting the leads to the indicator, or the masses may be individually damped mechanically by vanes or the like (not shown).

If desired the magnet means can be maintained stationary and two movable coils provided. Fig. 3 shows an example of such modification, wherein two magnets 12 are provided, both being attached to casings 10 and two coils 15 are suspended in the casings by springs 23 and 24. The moving systems (i. e., the springs and pickup coils) of the two detector units are made to have different natural periods of vibration. This can be done as in Fig. 1 either by using identical springs in the two units, and making the pickup coils of different weights, or by having the pickup coils the same weight and the spring characteristics different, or by both expedients. In Fig. 3 all parts of the two units are shown as the same except that the springs are made of different elastic constants by providing fewer turns for spring 24 as shown. The pickup coils are connected in opposition as shown so that when there is no relative movement between the two coils, as is the case at very low and very high frequencies, the net electrical output or signal is zero.

The provision of conventional seismograph appurtenances such as coil centering and aligning devices and adjusting means, is within the knowledge of those skilled in the art and needs no description.

The resonant frequencies of the two vibrating systems are selected more or less empirically to give the best overall results in the particular seismograph prospecting operations for which the detector is to be used. In typical cases one may have a natural vibratory frequency of 70 cycles per second and the other, 15 cycles per second, but the values for the high and low natural frequencies selected vary over a wide range depending on particular circumstances. Thus sometimes the two resonant frequencies may be fixed at 5 cycles and 1000 cycles; in another situation they may be made 375 and 425 cycles. In the neighborhood of the resonant frequency of the seismograph as a whole, the output depends critically on the applied frequency and on the amount of damping.

The detectors so far described (Figs. 1, 2 and 3) are of the velocity type; their electrical output corresponds to the instantaneous velocity of the vertical component of the earth's vibration at the detector. The invention can also be embodied in detectors of other response characteristics. The nature of a detector response can be described as displacement, velocity, acceleration, third derivative, etc. The present invention may be embodied in detectors of any of these types. It should be understood that these terms are only approximate descriptive terms because these instruments are usually operated near their resonance frequencies, where true displacement or velocity response or the like does not occur. The actual nature of the response depends on the vibration-responsive elements, the applied frequency, the character of the transducer (motion-indicating device) in the detector, and the method of coupling the transducer output to the amplifier. In all embodiments of the invention, however, the transducer is of such character as to produce a signal or indication which reflects the relative movement of the two vibratory systems, and without disturbing to more than a negligible degree the natural vibratory frequencies of the two mass systems.

Fig. 4 shows an embodiment of the invention as a displacement-type detector in which the output is proportional to the instantaneous displacement, that is to the instantaneous separation, of two masses. The detector includes a housing 10 in which are mounted at 35 and 36 two identical pairs of leaf springs 37 and 38 which support and aline two conductive inertia members 39 and 40 of unequal mass, disposed close together with a gap at 41, to form a sort of variable electric condenser. The electrical capacitance of combination 39, 40 considered as a condenser varies when the two masses are displaced with respect to each other. The detector of Fig. 6 is employed with a frequency-modulated oscillator, of a type known in the art, including a triode tube 42 and an oscillator inductance coil 43. The oscillator output is delivered through a detuned transformer 44 and a rectifier 45 to a conventional low-frequency amplifier 46. The condenser formed by inertia members 39 and 40 tunes the oscillator coil 43 to some convenient frequency, causing the tube to generate that frequency. The transformer feeds part of the oscillator energy to the rectifier which rectifies the high frequency so that the oscillator variations appear as low frequency fluctuations at the input of the low frequency amplifier 46. Motion between the seismograph masses 39 and 40 creates only frequency variations in the oscillator. These are converted into amplitude variations by detuning transformer 44 so that the oscillator frequency falls on one side of its resonance peak as illustrated in Fig. 5. Here F indicates the normal oscillator frequency and 47 indicates the maximum range of frequency variation. The corresponding range of high-frequency amplitude variation is indicated by 48. These variations when rectified by rectifier 45 correspond to the variations in relative position of the two detector means.

Fig. 6 shows the invention embodied in a detector of the piezo-electric type, including a piezo-electric crystal 50 of Rochelle salt for example, supported at its ends, at 52, from an upper mass 51 suspended from the case by a spring 53. Electrodes 54 engaging the crystal support a second mass 55 from a spring 56. Output leads 20 are connected to the electrodes. The crystal thus serves as a flexing beam supporting the second mass from the first. Flexure of the crystal produces voltages in leads 20 corresponding to the force acting between mass 51 and spring 56. The upper spring-mass combination 53, 51 is advantageously tuned to the higher frequency, e. g. 70 cycles, and the lower combination 56, 55 to the lower frequency, e. g. 15 cycles. What damping is required can conveniently be applied to the individual masses separately, as by vanes 57.

Figs. 7 and 8 show the character of typical response curves of two movable masses separately and of the response curve of the combination according to the invention. As applied to the embodiments illustrated in Figs. 1, 2, 3, 4, and 6, the individual response curves A, B, C and D represent the detector output which would result in any instance from vibration of one mass with the second mass fixed to the detector housing instead of being independently movable. In Fig. 7, the individual response curve A represents the independent behavior of the mass system having the lower frequency response and curve B that the higher. Curves A and B are each typical of heavy damping of the motion of each mass. Curve K shows the same function for the relative behavior of the two heavily damped systems. The output voltage is maximum at some frequency determined by a proper selection of constants for the movable mass system. Above and below this frequency, the output voltage falls off as shown. The detectors shown in the various illustrated embodiments can all be arranged to give a response such as curve K in Fig. 7 by suitable damping.

Fig. 8 illustrates the individual and combined response of the two mass systems when the damping is less than seven-tenths critical and is applied to the individual masses. Curves C and D indicate the individual response of each movable system, and curve E represents the difference of the response of the two individual systems or, in other words, the relative response. Since this difference is a vector quantity, the resultant may be larger than either of the original quantities, as in the range R.

The shape of the characteristic curves shown in Figs. 7 and 8 can be varied over wide limits by suitable selection of the various circuit elements and mechanical elements. The two humps of curve E shown in Fig. 8 may be of equal or different height. They may merge into one broad hump, as in curve K of Fig. 7, if much damping is provided or be two sharp peaks separated by a deep valley if the damping is very low.

Ordinarily, the amount of damping used is about seven-tenths of critical damping or less. This amount of damping does not shift the resonant frequency of the mass systems very seriously. In the system shown, there is no reaction whatsoever of one mass system on the other unless the damping is made to act on the relative motion between them. Even in this case neither system will have a serious effect on the frequency of the other provided that the damping is not excessive. The amount of damping ordinarily used might shift the frequency response of either moving system by as much as 10 to 30 per cent, but this would not appreciably affect the selectivity of the system. The curve E of Fig. 8 has a particularly desirable characteristic, as the response is fairly uniform over a considerable range, yet the high and low frequency cut-offs are fairly sharp. When the detector elements are tuned to 15 and 70 cycles, for example, the maximum response may occur approximately at either or both of these frequencies, or at any point between them, depending mainly on the damping used. The detector combination can also be made to give a response such as that shown by curve E in Fig. 8, by damping only the relative motion of the two masses as by the electro-magnetic damper 21 in Fig. 1.

What I claim is:

1. A frequency selective apparatus for detecting seismic waves comprising in combination a pair of seismic wave detectors of resonant type having different resonant frequencies and adapted to produce electrical signals corresponding to seismic vibrations received thereat, the response of each detector being maximum at the resonant frequency thereof, and electrical circuit means for combining the detector outputs in opposition; whereby the magnitude of the combined detector output signal is relatively great within a predetermined frequency range between and somewhat beyond said resonant frequencies and is less at higher and lower frequencies.

2. In a seismograph detector, a dual translating means comprising mechanical-vibration-responsive magnet means in vibration-receiving relationship to the earth, two movable coils spaced therefrom and each adapted in cooperation with said magnet means to produce electrical signals on movement of the coils with respect thereto, and resilient means mounting the two coils for movement at different natural vibratory frequencies, independently with respect to each other and with respect to the magnet means; and an electrical circuit receiving the outputs of the coils in opposition; whereby at relatively low frequencies below the lower of said natural frequencies said coils tend to move in unison with the magnet means and produce a small resultant signal, at relatively high frequencies above the upper of said natural frequencies the coils tend to remain stationary in space and produce a small resultant signal, and at frequencies intermediate said natural frequencies the coils move in phase difference with respect to each other and produce a relatively large resultant signal.

3. In a seismograph detector, means adapted to be vibrated by and in sympathy with the earth and two mass members resiliently supported with respect to said means, for vibratory movement with respect thereto, said members having different resonant frequencies relative to each other, each of said members being constructed and arranged, in cooperation with said means, to serve as an electrical translating device capable of giving an oscillating electrical signal on relative movement between the member and said means, and an electrical circuit receiving the outputs of the translating means in electrical opposition; whereby at relatively low frequencies, substantially below said resonant frequencies, said mass members tend to move in unison with the vibration-responsive means and produce a small resultant signal, at relatively high frequencies substantially above said resonant frequencies, the members tend to remain stationary in space and produce a small resultant signal, and at frequencies intermediate said resonant frequencies the members move in phase difference with respect to each other and produce a relatively large resultant signal.

OTTO F. RITZMANN.